(12) United States Patent
Gremaud (10) Patent No.: US 11,611,791 B2
(45) Date of Patent: Mar. 21, 2023

(54) METHOD AND DEVICE TO TRANSFER A VIDEO STREAM BETWEEN A HOST DEVICE AND AN ELECTRONIC DESCRAMBLING DEVICE

(71) Applicant: NAGRAVISION S.A., Cheseaux-sur-Lausanne (CH)

(72) Inventor: Fabien Gremaud, Chatel-St-Denis (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 154 days.

(21) Appl. No.: 17/149,840

(22) Filed: Jan. 15, 2021

(65) Prior Publication Data
US 2021/0136438 A1 May 6, 2021

Related U.S. Application Data (63) Continuation of application No. 15/755,344, filed as application No. PCT/EP2016/070274 on Aug. 29, 2016, now Pat. No. 10,931,997.

(30) Foreign Application Priority Data

Sep. 1, 2015 (EP) .................................. 15183327

(51) Int. Cl.
*H04N 7/167* (2011.01)
*H04N 21/418* (2011.01)
(Continued)

(52) U.S. Cl.
CPC ... *H04N 21/4181* (2013.01); *H04N 21/26613* (2013.01); *H04N 21/43607* (2013.01);
(Continued)

(58) Field of Classification Search
CPC ......... H04N 21/4181; H04N 21/26613; H04N 21/43607; H04N 21/4405; H04N 21/8352
(Continued)

(56) References Cited

U.S. PATENT DOCUMENTS 6,064,676 A * 5/2000 Slattery ............ H04N 21/23614
370/535
6,463,059 B1 10/2002 Movshovich
(Continued)

FOREIGN PATENT DOCUMENTS

| CN | 107925782 B | 7/2020 |
| EP | 2804388 A1 | 11/2014 |

OTHER PUBLICATIONS

"Universal Serial Bus Device Class Definition for Video Devices: MPEG-2 TS Playload", Retrieved from the Internet: URL: http://whereabouts.eecs.umich.edu/wiki/lib/exe/fetch.php?id=mscontext_entry_1&cache=cache&media=usb video payload mpeg-2 tx 1.1. pdf, XP 055242243, (Jun. 1, 2005).
(Continued)

*Primary Examiner* — Jeffrey C Pwu
*Assistant Examiner* — Samuel Ambaye
(74) *Attorney, Agent, or Firm* — Oblon, McClelland, Maier & Neustadt, L.L.P.

(57) ABSTRACT

A method to transfer a video stream from a host device comprising a controller configured for bulk transfers to a descrambling device, comprises: forming a chain out transfer comprising a chain out header linked with multiple chain out descriptors, the first chain out descriptor pointing to an out description packet containing at least one producer ID, the second and subsequent chain out descriptor pointing to chunks from the video stream, the last chain out descriptor being configured to generate an interrupt; forming a chain in transfer comprising a chain in header linked with a plurality
(Continued)

of chain in descriptors, each chain in descriptor pointing to a descrambled chunk; requesting the controller to process the chain; receiving the description packet by the descrambling device and using key data associated with the chunks to descramble them; receiving by the controller the descrambled chunks and triggering an interrupt on the last chunk.

9 Claims, 5 Drawing Sheets

(51) Int. Cl.
    *H04N 21/436*    (2011.01)
    *H04N 21/4405*    (2011.01)
    *H04N 21/266*    (2011.01)
    *H04N 21/8352*    (2011.01)
    *H04N 21/84*    (2011.01)

(52) U.S. Cl.
    CPC ..... *H04N 21/4405* (2013.01); *H04N 21/8352* (2013.01); *H04N 21/84* (2013.01)

(58) Field of Classification Search
    USPC ......................................................... 380/228
    See application file for complete search history.

(56) References Cited

U.S. PATENT DOCUMENTS

| | | |
|---|---|---|
| 10,931,997 B2 | 2/2021 | Gremaud |
| 2005/0038939 A1 | 2/2005 | Lee |
| 2013/0308923 A1* | 11/2013 | Nakashika ........... H04N 9/8042 |
| | | 386/248 |

OTHER PUBLICATIONS

International Search Report Issued in International Application No. PCT/EP2016/070274 dated Nov. 21, 2016.
Written Opinion Issued in International Application No. PCT/EP2016/070274 dated Nov. 21, 2016.

* cited by examiner

METHOD AND DEVICE TO TRANSFER A VIDEO STREAM BETWEEN A HOST DEVICE AND AN ELECTRONIC DESCRAMBLING DEVICE

CROSS-REFERENCE TO RELATED APPLICATIONS

This is a continuation application of U.S. application Ser. No. 15/755,344, filed Feb. 26, 2018, which is a National Stage of International Application No. PCT/EP2016/070274, filed Aug. 29, 2016, which claims the benefit of European Patent Application No. 15183327.4, filed Sep. 1, 2015, the entire contents of each of which are hereby incorporated by reference herein in their entirety.

INTRODUCTION

Multimedia contents may be transmitted in various ways from a provider to an end user. In order to protect this valuable content, scrambling (encrypting) may be performed to the content so that only authorized persons can have access to it.

Reception of the scrambled multimedia content may be done on different devices such as a personal computer, a tablet, a smartphone, or other devices that may not have the necessary descrambling (decrypting) capabilities to access the content.

BRIEF DESCRIPTION OF THE INVENTION

In one embodiment, an electronic descrambling device may be connected to a host device and configured to descramble multimedia content. An electronic descrambling device is a portable module comprising electronic chips connected via a communication port with the host device. It is generally called "dongle". The electronic chip comprises a descrambling engine and memories to temporary store the incoming data chunk. According to a particular embodiment, the electronic descrambling device is a USB dongle and the video stream is a MPEG stream.

Currently, transfer protocols to an electronic descrambling device are not adapted to the continuous exchange of data at a bit rate compatible with video streams. They have been designed to accommodate the transfer of storage data. To address this problem, it is proposed a method to descramble at least one video stream originating from at least one producer, having a producer ID, by an electronic descrambling device connected to a host device, said host device comprising a controller comprising a bulk pipe out and a bulk pipe in transfer, comprising, at the host device:
  for each producer, defining a chunk of data from the video stream,
  forming a chain of out transfer, the chain of out transfer comprising a chain out header (oqH) linked with a plurality of chain out descriptors (oqTD), the first chain out descriptor pointing to a out description packet containing the at least one producer ID, the second and subsequent chain out descriptor pointing to the chunk of data, each chunk of data being of a particular producer,
  forming, by the host device, a chain of in transfer, the chain of in transfer comprising a chain in header (iqH) linked with a plurality of chain in descriptors (iqTD), each chain in descriptor pointing to a descrambled chunk of data, and the last chain in descriptor being configured to generate an interrupt,
  transferring the chain of out transfer by the controller to the electronic descrambling device, thus transferring to the electronic descrambling device the scrambled data chunk,
  at the electronic descrambling device:
  receiving the description packet by the electronic descrambling device and identifying by the electronic descrambling device key data associated with the at least one chunk,
  using the key data to descramble the scrambled data chunk,
  returning the descrambled data to the host device,
  at the host device:
  receiving the chain of in transfer by the controller, thus waiting from the electronic descrambling device the chunk descrambled data,
  storing the received descrambled data chunk at an address indicated by the correspond chain in descriptor (iqTD),
  triggering an interrupt by the reception of the last descrambled chunk.

The format of the multimedia content is preferably an MPEG stream. An MPEG stream typically comprises several sub-streams having each a different packet identifier (PID). Examples of sub-streams are audio, video, data, and caption. Sub-streams pertain to the same multimedia content from a channel A MPEG stream can comprise several channels, the description of each sub-stream being located into the Program Map Table (PMT). As far as the scrambling of data is concerned, the keys loaded into the electronic descrambling device are dedicated to a sub-stream and identified using the producer ID and the PID.

BRIEF DESCRIPTION OF THE FIGURES

The following detailed description will be better understood thanks to the attached figures in which.

DETAILED DESCRIPTION

Figure 1:
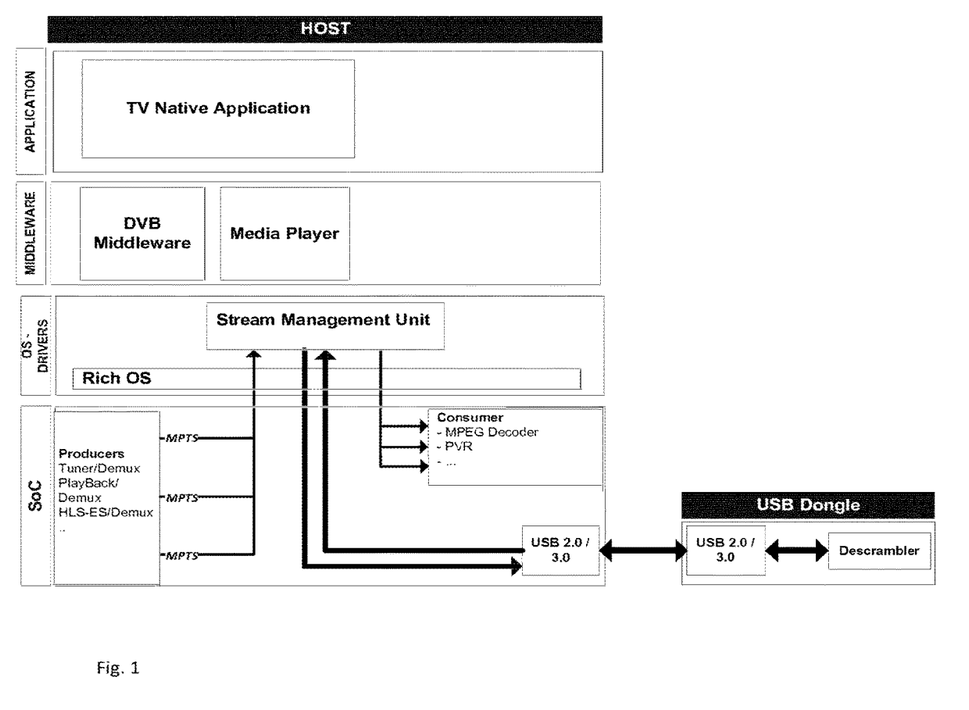
FIG. 1 illustrates a block diagram of the host device in connection with the electronic descrambling device.

FIG. 1 illustrates the different components of one embodiment of the invention. The Host (which may be for example a home multimedia receiver) comprises various layers. The top layer may be the TV Native Application. A Middleware layer may include a DVB Middleware and the Media Player modules. The OS Drivers may be lower layers containing the Stream Management Unit in charge of executing one embodiment of the invention. The communication layer SoC may be configured for the handling of the MPEG streams and may include the communication module (USB controller) with the electronic descrambling device. In the following description, the electronic descrambling device will be named "dongle".

Figure 2:
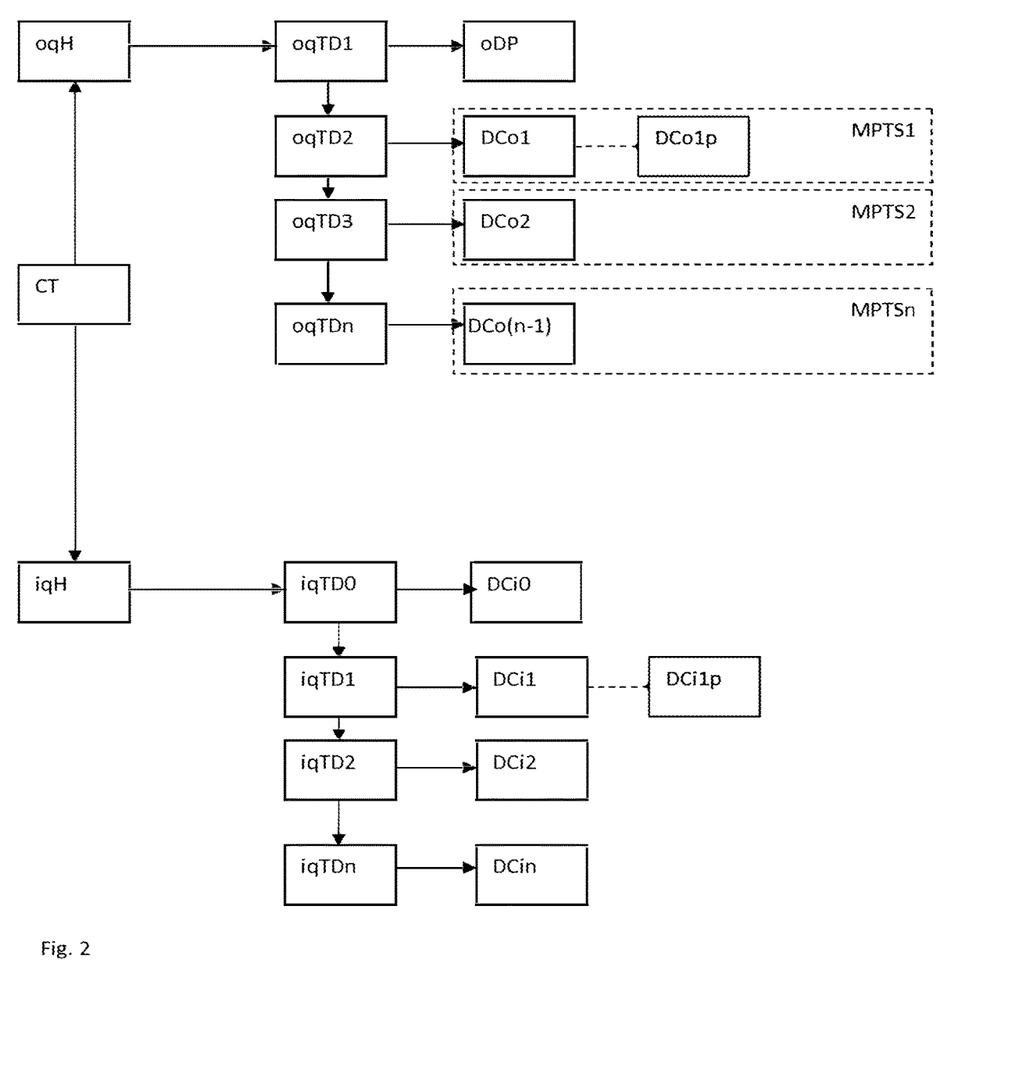
FIG. 2 illustrates the format of the chain in and out queue according one example of the invention.

FIG. 2 describes one example of the formatting of a chain for a controller, in particular a USB controller. The application layer, in the host device, receives the MPEG stream (or a plurality of MPEG streams) and formats the chain in and chain out (CT) in order to instruct the USB controller. The chain out starts with a chain out header (oqH) playing the role of the link with the chain out descriptors (oqTD1 to oqTDn). The first chain out descriptor (oqTD1) is pointing to the out description packet containing the at least one producer ID. The application layer is in charge of composing the chains and extracts the producer ID from the MPEG stream. The application layer then loads the producer ID into the out description packet (oDP).

The first chain out descriptor (odTD1) points to the second chain out descriptor (odTD2). This second chain out descriptor (and the following chain out descriptors) points to the chunk of data extracted from the MPEG stream. The application layer handling the MPEG stream splits the stream into chunks of data and loads them into the buffer memory at an address loaded into the chain out descriptor.

The application layer can load more than one chunk into the chain in accordance with the maximum number of chain out descriptors handled by the chain.

Figure 3A:
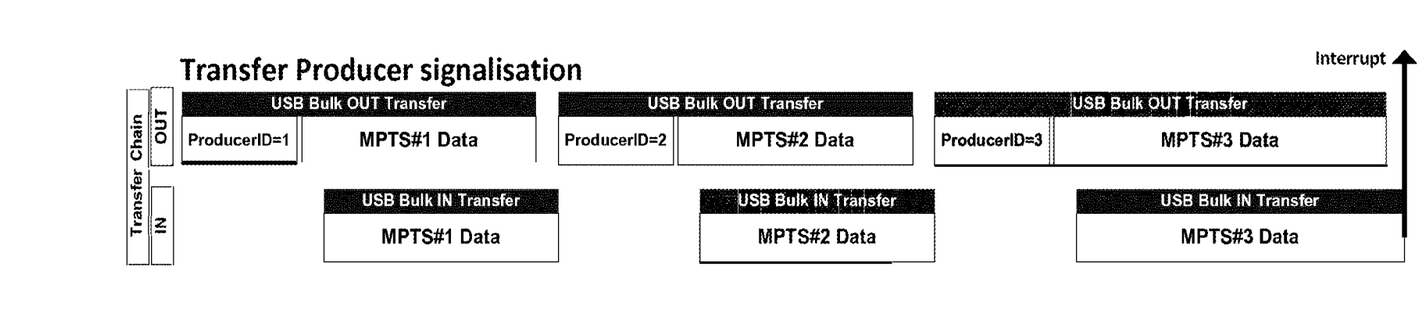
FIG. 3a illustrates a first embodiment of the transfer chain.
Figure 3B:
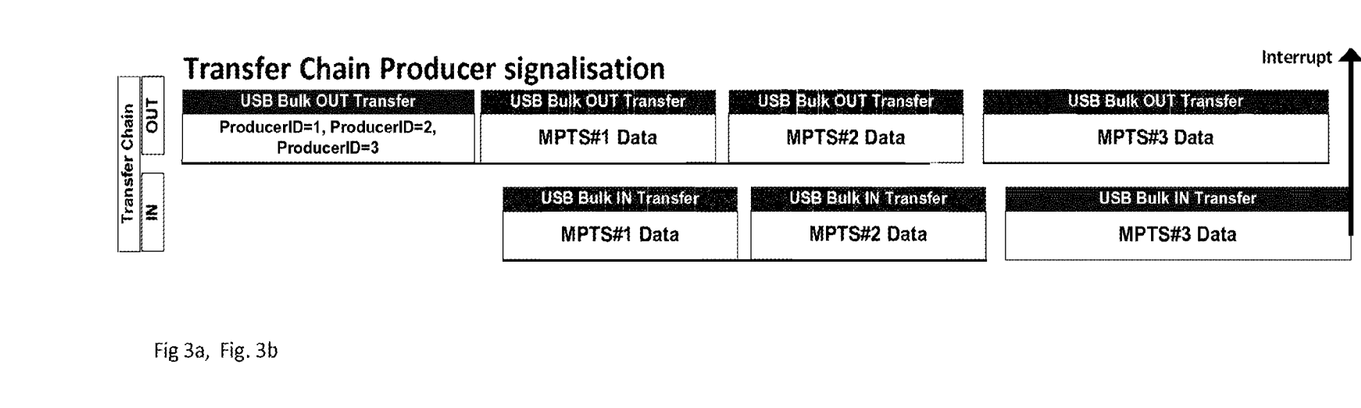
FIG. 3b illustrates a second embodiment of the transfer chain.

According to the example of FIGS. 3a and 3b, when the application layer is processing more than one MPEG stream, the producer ID of each stream is loaded into the out descriptor packet (oDP). This is illustrated by the FIG. 3b in which three streams are processed and the producer ID1, the producer ID2 and the producer ID3 are loaded into the out descriptor packet.

The MPTS1 Data, forming the first data chunk, is then pointed by the second chain out descriptor (oqTD2), the MPTS2 Data, forming the second data chunk, is then pointed by the third chain out descriptor (oqTD) and the MPTS3 Data, forming the third data chunk, is then pointed by the fourth chain out descriptor (oqTD1).

The application layer also configures the chain in. The chain in and chain out are connected together and form a single event. Once configured, the application layer calls the USB controller to execute the chain operations. The chain in is a chain starting with a chain in header (iqH) linked with a plurality of chain in descriptors (iqTD). Each chain in descriptor points to a chunk of data resulting from the processing (i.e. descrambling) by the USB dongle.

The last chain in descriptor (iqTDn) is configured to trigg an interrupt when the USB controller receives the last chunk of processed data by the USB dongle.

Each chain in descriptor is associated with a MPEG stream. Depending of the implementation of the USB controller, the size of data chunk can vary. According to one example, a data chunk comprises a plurality of packets. Each packet represents a USB transaction. According to one example of forming a chain of packets, each packet has a size equal to the nominal size (e.g. 512 Bytes), except the last packet. The non-nominal size of the packet indicates that this is the last packet of the data chunk. This is illustrated in the FIG. 2 by the box DCo1 to DCop. The last packet of the data chunk has a size different than the nominal size, thus indicating that it is the last packet of the data chunk.

According to another example of realization, the chain out transfer is configured such as the producer ID is placed in the data chunk, into the first packet. The producer ID is placed in a data header preceding the data chunk and both are concatenated by the USB controller and transferred in a single USB transaction.

This is the case illustrated at the FIG. 3A. The first chain out descriptor points to at least two packets, one being the packet containing the producer ID and the second one (and further ones) being the packets of the data chunk of the MPEG stream. The chain in is the same as in the first example.

When the USB controller is supporting both 3a and 3b, 3a and 3b share a common field in their respective header allowing the dongle USB controller to differentiate between a 3a and a 3b chain of descriptor. This allows a host to choose the most efficient transfer for a specific processing.

Once the chain out and in is configured, the USB controller receives a signal from the application layer and the chain is processed. The transfer to the USB dongle is executed by the USB controller for example using the bulk in and out transfer. The USB controller activates and transfers the data as instructed.

The USB dongle receives the chain out and retrieves the producer ID from the corresponding packet. With the producer ID, the USB dongle can retrieve the key data corresponding to the data chunk. The USB dongle receives through another USB channel, key data related to the MPEG streams to proceed.

The USB dongle comprises a key table populated with the key data for each MPEG stream. According to a first example, the key table comprises for each producer ID, the key data related to this producer. Preferably, the key data comprises an odd and an even key, one being currently used and the other one ready for the next key change. A bit in the chunk data indicates the current key to be used.

This key table can further contain a packet identifier PID (or program ID) in case one producer ID is associated with a plurality of key data. The table will be then as follows:

| Producer ID | PID ID | Key odd | Key even |
|---|---|---|---|
| PRID1 | PID12 | Value | Value |
| PRID1 | PID15 | Value | Value |
| PRID2 | PID3 | Value | Value |
| PRID3 | PID10 | Value | Value |

An example of the value of the keys is a 128 bits pseudorandom number.

In the above example, the producer PRID1 is associated with an MPEG stream comprising two sub-streams needing key data to be descrambled. Each sub-stream is identified by a PID identifier or program ID (in our example PID12 and PID15), each sub-stream being associated with different key data.

The key table is received by the host device from an authorization server or can be extracted from one or more MPEG stream. According to an embodiment of the invention, the USB dongle comprises the key(s) necessary to decrypt the encrypted key data. The encrypted key data can be in the form of ECM (Entitlement Control Message) extracted from the MPEG stream by the host and transferred to the USB dongle.

According to another embodiment, the host can request a license file from an authorization server and can pass the license file to the USB dongle once received from the authorization server. The license file is decrypted and the key data are used to populate the key table. The USB dongle can comprise a personal key to decrypt the encrypted key data (license or ECM).

Once the USB dongle has descrambled the data chunk using the corresponding key data, the descrambled data chunk are sent to the host device, in particular to the USB controller. The latter stores the received data at the address indicated in the first chain out descriptor. As a consequence, a data chunk DCo1 is transferred by the USB controller to the USB dongle and when the USB dongle returns the data chunk DCi1, the USB controller stores it at the address indicated by the first chain in descriptor iqTD1.

When the last data chunk has been stored in the chain in queue the USB controller initiates an interrupt to inform the application layer.

The application layer can then retrieve the descrambled data chunk and can deliver it to a consumer such as a multimedia player.

Figure 4:
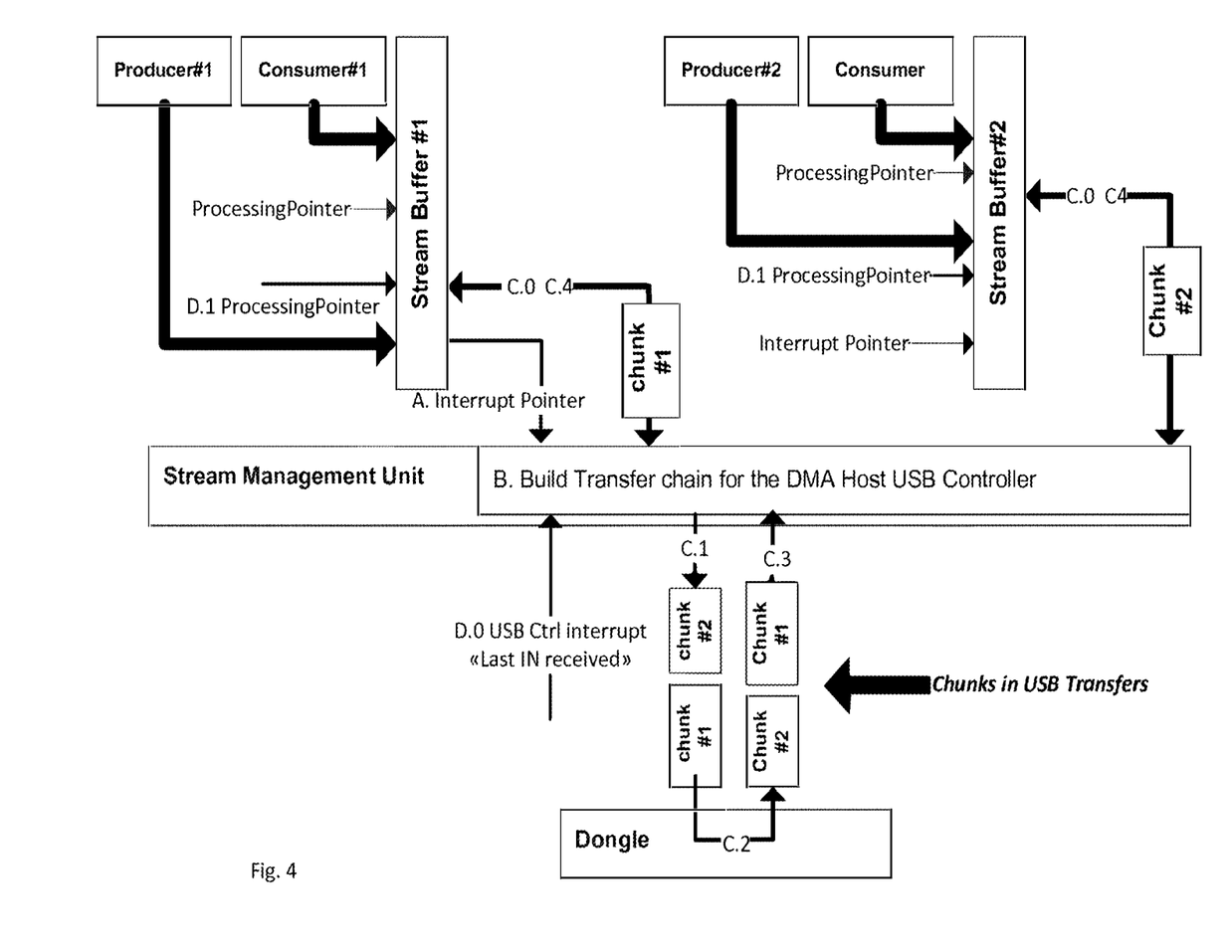
FIG. 4 illustrates the management of the queues in a buffer.

It is to be noted that a MPEG stream is loaded into a stream buffer as illustrated at the FIG. 4. The host can process several MPEG streams in parallel and the FIG. 4 illustrates two MPEG streams from two producers (Producer #1, Producer #2). The application layer is in charge of the management of the Stream Buffer #1 and #2. A buffer is dedicated to one producer and the application layer mainly deals with the pointers of the buffer. The buffer is filled with data coming from an MPEG source. When the chain in and chain out are defined, the USB controller process the data chunk (chunk #1 for the Producer #1 and chunk #2 for the Producer #2) so that more than one MPEG source can be processed in parallel. The consumer is using the buffer architecture and handles its own pointers to the descrambled data.

According to the illustrated example, the stream buffer is the same for the scrambled and descrambled data. However, in accordance with another example, the buffer for the scrambled data is independent to the buffer of the descrambled data. In this case, the USB controller, while receiving the descrambled chunk from the USB dongle, stores them into the in buffer.

This formatting and handling of chain buffer is particularly adapted to USB 2.0 transmission.

However, other protocol layer can be used to transfer the data based on stream buffer and chain pointer and descriptor as described above.

Figure 5:
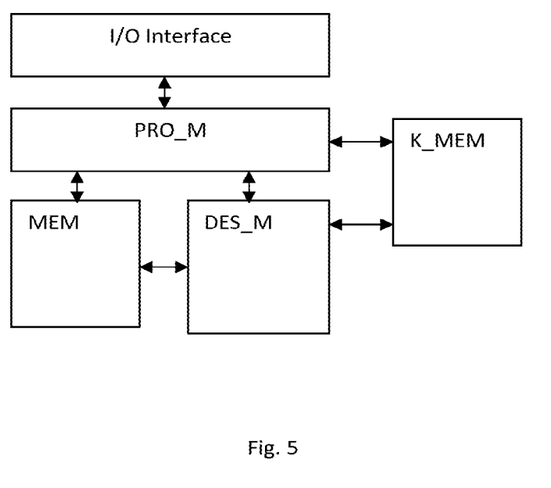
FIG. 5 illustrates an example of the modules in a electronic descrambling device.

FIG. 5 illustrates a block diagram of the dongle. The dongle comprises four main blocks, the I/O interface block, the processing block PO_M, the memory MEM and the descrambling module DES_M.

The I/O interface is connectable with the host device to receive the data via the dedicated USB signals. The processing block PRO_M is in charge of directing the flow of data entering and exiting via the I/O Interface to the memory MEM. The memory acts as a buffer memory and the pointers (in and out pointers) are handled by the processing block. The data chunks are stored in the memory and the pointer for this chunk is passed to the descrambling module. The processing block also keep track of the producer ID for said chunk of data and loads the related keys into the descrambling module. The descrambling module, when the chunk is descrambled, stores the descrambled chunk and sends a signal to the processing module. The pointer is then passed to the I/O interface which routes the descrambled chunk into the I/O Interface. The processing block is in charge of executing the chain's instruction. The structure of the chain is known by the processing block and the elements of the chain extracted so that the processing block knows for each data chunk, which producer ID is related to. For that purpose, the processing block is connected with a key memory K_MEM to store the keys received from the host device via the USB Interface.

According to another embodiment, the keys memory K_MEM is directly connected to the descrambling module and this module, when the processing block instructs to descramble a data chunk identified by producer ID, loads the keys related to said producer ID in the key registers.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. An electronic descrambling device for descrambling a video stream, the video stream originating from a producer, said electronic descrambling device comprising:
   processing circuitry configured to
      receive a chain out transfer from an I/O interface connectable with a host device and thus receive a scrambled data chunk, wherein the scrambled data chunk is of a particular producer and defined from the video stream, and the chain out transfer comprises a chain out header linked with a plurality of chain out descriptors, a first chain out descriptor pointing to an out description packet containing a producer ID, second and subsequent chain out descriptors pointing to a corresponding data chunk,
      receive the out description packet;
      retrieve the producer ID from said out description packet;
      identify key data associated with the scrambled data chunk using the retrieved producer ID;
      use the identified key data to descramble the scrambled data chunk, and
      return the descrambled data to the I/O interface connectable with the host device.

2. The electronic descrambling device according to claim 1, wherein the electronic descrambling device is a USB Dongle.

3. The electronic descrambling device according to claim 1, further comprising a memory storing a key table populated with, for each producer ID of a plurality of producer IDs, key data related to said producer ID.

4. The electronic descrambling device according to claim 3, wherein the key table contains a packet identifier PID or a program ID, in case one producer ID is associated with a plurality of key data.

5. The electronic descrambling device according to claim 1, further comprising a memory storing a personal key, wherein the processing circuitry is further configured to receive the key data encrypted from the host device, and decrypt the encrypted key data using the stored personal key.

6. The electronic descrambling device according to claim 5, wherein the processing circuitry is further configured to obtain the encrypted key data in a form of an Entitlement Control Message.

7. The electronic descrambling device according to claim 5, wherein the processing circuitry is further configured to obtain the encrypted key data in a license file.

8. The electronic descrambling device according to claim 1, further comprising the I/O interface connectable with the host device, a memory acting as a buffer memory and configured to store data chunks,
   wherein the processing circuitry is further configured to direct a flow of data entering or exiting via the I/O interface to the memory, and
   the processing circuitry includes descrambling circuitry, wherein the processing circuitry is further configured to handle in and out pointers of the buffer memory, pass a pointer for a data chunk stored in the memory to the descrambling circuitry, keep track of the producer ID for said data chunk, and load the key data into the descrambling circuitry.

9. The electronic descrambling device according to claim 1, further comprising a key memory to store the key data received from the host device.

\* \* \* \* \*